United States Patent [19]

Ywoskus et al.

[11] Patent Number: 5,528,605
[45] Date of Patent: Jun. 18, 1996

[54] DELAYED ACKNOWLEDGEMENT IN AN ASYMMETRIC TIMER BASED LAN COMMUNICATIONS PROTOCOL

[75] Inventors: John A. Ywoskus, Milford; Bruce E. Mann, Mason, both of N.H.; Kenneth J. Izbicki, Pepperell; Roger H. Levesque, Tewksbury, both of Mass.

[73] Assignee: Digital Equipment Corporation, Maynard, Mass.

[21] Appl. No.: 328,946

[22] Filed: Oct. 25, 1994

Related U.S. Application Data

[63] Continuation of Ser. No. 784,356, Oct. 29, 1991.

[51] Int. Cl.⁶ ............................ H04J 3/06; H04L 1/18
[52] U.S. Cl. ................................. 371/33; 370/108
[58] Field of Search ................. 371/33, 32; 370/60, 370/85.1, 85.7, 94.1, 108

[56] References Cited

U.S. PATENT DOCUMENTS

| | | | |
|---|---|---|---|
| 4,479,215 | 10/1984 | Baker | 371/33 |
| 4,527,267 | 7/1985 | Cohen | 370/60 |
| 4,558,428 | 12/1985 | Matsumura et al. | 364/900 |
| 4,584,679 | 4/1986 | Livingston et al. | 370/94 |
| 4,617,657 | 10/1986 | Drynan et al. | 370/60 |
| 4,689,785 | 8/1987 | Toyonaga et al. | 370/85 |
| 4,739,321 | 4/1988 | Friedman et al. | 340/825.5 |
| 4,818,984 | 4/1989 | Chang et al. | 340/825.54 |
| 4,896,151 | 1/1990 | Kuranami et al. | 340/825.520 |
| 4,975,905 | 12/1990 | Mann et al. | 370/85.1 |
| 5,001,705 | 3/1991 | Kobatake et al. | 370/94.1 |
| 5,003,534 | 3/1991 | Gerhardt et al. | 370/94.1 |
| 5,058,108 | 10/1991 | Mann et al. | 370/85.1 |

*Primary Examiner*—Robert W. Beausoliel, Jr.
*Assistant Examiner*—Trinh Tu
*Attorney, Agent, or Firm*—Diane C. Drozenski; Denis G. Maloney; Arthur W. Fisher

[57] ABSTRACT

A computer communications system has a controller for controlling a master with a circuit timer, the circuit timer is capable of aggregating data produced during a circuit timer interval into a single master message, and the data is produced by a plurality of users, where each user is capable of establishing a plurality of sessions. There is a communication pathway, responsive to expiration of the circuit timer interval, for sending the aggregated data to a slave. Also there is a acknowledgement circuit for the slave to send an acknowledge message to the master upon expiration of a delay ACK time interval, the delay ACK time interval is greater than the circuit timer interval, and the circuit timer is capable of initiating sending of a plurality of master messages during one delay ACK time interval. Further, there is a delay acknowledgement circuit, responsive to receipt of the plurality of master messages, for the slave to acknowledge the plurality of master messages in one acknowledge message, and each user and each session being acknowledged by the one acknowledge message.

17 Claims, 6 Drawing Sheets

DELAYED ACKNOWLEDGEMENT IN AN ASYMMETRIC TIMER BASED LAN COMMUNICATIONS PROTOCOL

This application is a continuation of application Ser. No. 07/784,356, filed Oct. 29, 1991.

FIELD OF THE INVENTION

This invention relates to transfer of data between a master and a slave, and more particularly relates to reduction of the acknowledgment message traffic transmitted from the slave to the master.

BACKGROUND OF THE INVENTION

When a number of terminals access at least one slave computer using a communications system, as for example, a Local Area Network (LAN) having a communications protocol, total message traffic on the LAN may grow to exceed the capacity of the LAN. Total message traffic on the LAN may be particularly heavy when the terminals are small computers capable of up-loading files to the slave, and also when the terminals are capable of supporting a windows protocol. For example, a "mouse" input device is usually supported by a windows protocol, and motion of the mouse may generate a large number of messages to the slave (host) containing mouse position information. Also, in a windows protocol a terminal occasionally must transfer large amounts of data, for example the values of each pixel in the screen display, to the slave computer. In any event, the LAN may be overwhelmed by the amount of data being transferred from the terminal to the slave computer.

Communications protocols frequently require that each message sent from the terminal be acknowledged by the slave. The acknowledgment requirement is instituted in order to keep track of messages which are corrupted by noise on the communications circuits, or otherwise lost. A protocol having a terminal server as a master and a host computer as a slave is disclosed in U.S. Pat. No. 4,975,905, "Message Transmission Control Arrangement for Node in Local Area Network", issued Dec. 4, 1990, to Mann, Duffy, Lauck, and Strecker, and this protocol requires an acknowledgment by the slave to the master.

As a consequence of the acknowledgment requirement, each message from the terminal to the slave generates an acknowledgment message, and additionally usually generates one or more further response messages created by the slave in response to processing the received message. Congestion on the LAN therefore arises not only from the messages sent by the master to the slave computer, but also from the acknowledgment traffic sent from the slave to the master.

Delayed acknowledgment protocols have been used in the past in order to reduce ACK traffic on a local area network. However, a traditional implementation of delayed acknowledgment, as for example described in the textbook "Computer Networks" Second Edition, by A. S. Tanenbaum, published by Prentice Hall, Englewood Cliffs, N.J., in 1988, at Section 4.4 "Sliding Windows Protocol", pages 233–239, will not work optimally with a master—slave protocol.

It is desirable for the slave computer to both acknowledge the receipt of message packets from the master, and to reduce the number of messages carried by the local area network.

SUMMARY OF THE INVENTION

The slave computer acknowledges messages from the master and also reduces the number of acknowledgment messages transmitted on the local area network by use of a delay acknowledgment protocol.

There is provided an apparatus for communicating between a master and a slave computer. A computer communications system has a means for controlling a master with a circuit timer, the circuit timer is capable of aggregating data produced during a circuit timer interval into a single master message, and the data is produced by a plurality of users, where each user is capable of establishing a plurality of sessions. There is a means, responsive to expiration of the circuit timer interval, for sending the aggregated data to a slave. Also there is a means for the slave to send an acknowledge message to the master upon expiration of a delay ACK time interval, the delay ACK time interval is greater than the circuit timer interval, and the circuit timer is capable of initiating sending of a plurality of master messages during one delay ACK time interval. Further, there is a means, responsive to receipt of the plurality of master messages, for the slave to acknowledge the plurality of master messages in one aggregated acknowledge message.

The apparatus has a means for the master to send a message packet to the slave computer; a means for the slave computer to send an acknowledgment to the master, the acknowledgment capable of indicating that the message packet was received by the slave computer; a means for the master and the slave computer to select a delay ACK time interval; and, a means for the slave computer to delay sending the acknowledgment to the master by a time interval of the delay ACK time interval. Also the apparatus has a means for the master to override the means for the slave computer to delay sending the acknowledgment by setting a response requested flag in a message, and in response to receiving the message with the response requested flag set the slave computer sends an acknowledgment to the master without delay.

Also the apparatus has a means for the master to send a plurality of messages to the slave computer without receiving an acknowledgment; and, a means for the slave computer to delay sending a group acknowledgment that at least a first group of the plurality of messages were received, where the slave computer delays by a time interval of the delay ACK time interval in sending the group acknowledgment.

The apparatus also has a means for the master to send a proposed delay ACK time interval to the slave computer; and, means for the slave computer to accept the proposed delay ACK time interval. The means for the slave computer to accept the proposed delay ACK time interval is for the slave computer to transmit a RUN message. Also, the slave computer may reject using a delay ACK time interval.

Further, the apparatus has a means for the master to send a proposed delay ACK time interval to the slave computer; a means for the slave computer to propose an alternative delay ACK time interval; and, a means for the master to accept the alternative delay ACK time interval. The means for the master to accept the proposed alternative delay ACK time interval is for the master to send a RUN message to the slave computer. Alternatively, the master may reject the proposed alternative delay ACK time interval.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several drawings.

DETAILED DESCRIPTION

Figure 1:
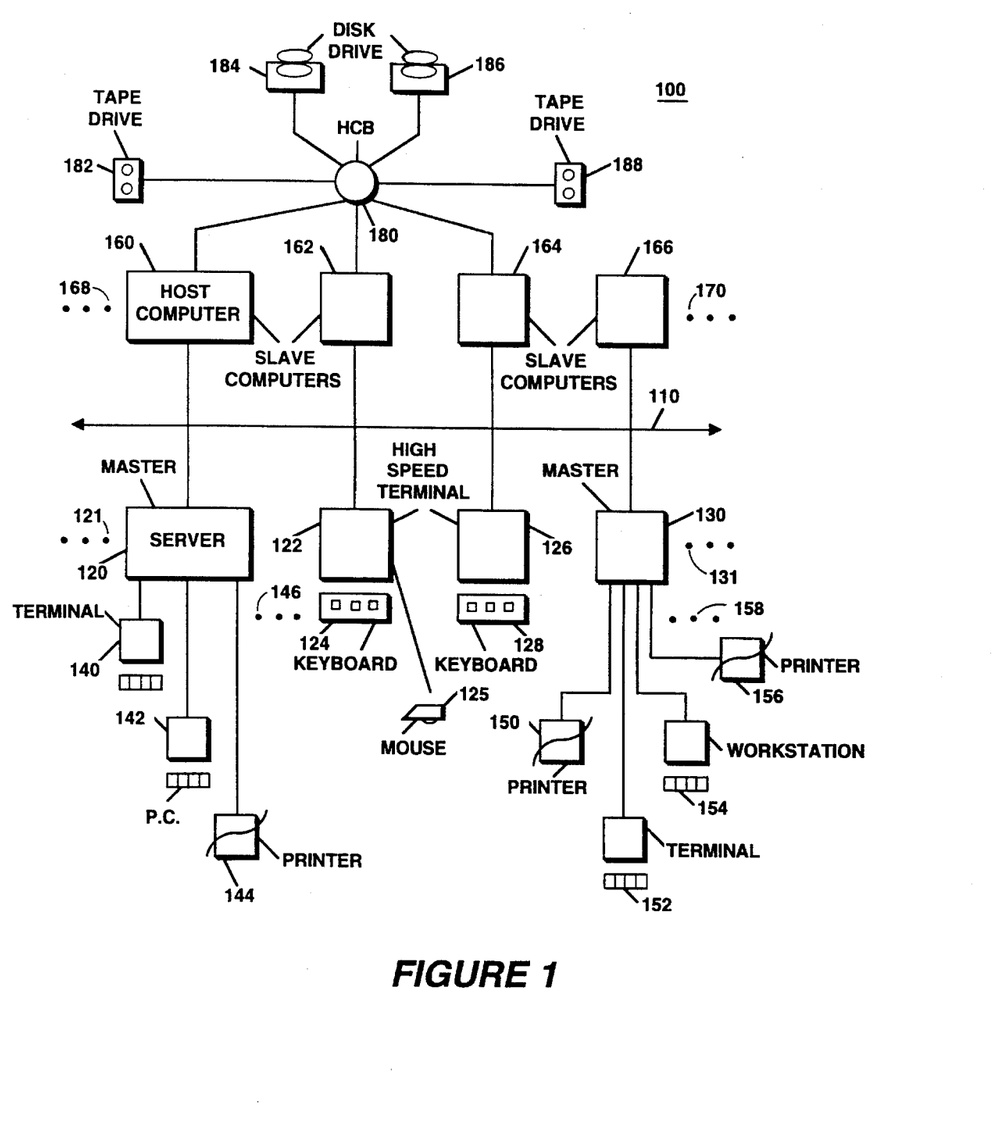
FIG. 1 is a block diagram of a communications system in accordance with the present invention.

Referring now to FIG. 1, there is shown generally communication system 100. Communications pathway 110 provides a communications pathway for computers and associated equipment connected to the communication system 100. For example, communications pathway 110 may be an Ethernet CSMA/CD local area network. Alternatively, communications pathway 110 may be any convenient local area network such as those defined under IEEE 802 local area network standards.

In FIG. 1, the following representative equipment is connected to communications pathway 110, master 120, high speed terminal 122 with keyboard 124, high-speed terminal 126 with keyboard 128, and master 130. Dots 121 and dots 131 indicate that a further plurality of masters may be connected to communications pathway 110. Also mouse 125 provides input to high-speed terminal 122, and each position increment of the mouse may generate a data message on communications pathway 110.

Master 120 provides a fan-in for terminal 140, personal computer 142, and printer 144. Dots 146 indicate that a plurality of additional units may be connected through master 120 to communications pathway 110.

High-speed terminal 122 and high-speed terminal 126 are connected as individual masters to communications pathway 110. For example, high-speed terminals 122 and 126 may use a windows protocol. In a windows protocol a terminal may be required to transfer large quantities of data from the terminals onto the communications pathway 110. For example, the terminal may be required to send a full screen display, with a plurality of bits for each pixel, to a slave computer.

Master 130 serves as a fan-in connection for a number of individual units, as shown, for example, in FIG. 1. The individual units comprise a printer 150, a terminal 152, a workstation 154, and another printer 156. Dots 158 indicate that a further plurality of devices may be connected through master 130 to communications pathway 110.

Also connected to communications pathway 110 are slave computers 160, 162, 164, and 166. Dots 168 and dots 170 indicate that a further plurality of slave computers may be connected to communications pathway 110.

The slave computers, slave computer 160, 162, 164, 166, may operate using a variety of operating systems. For example, slave computer 162, 164 are shown connected through hub 180 as a cluster of computers. Also connected to hub 180 are various mass storage devices such as tape drive 182, disk drive 184, disk drive 186, and tape drive 188. For example, slave computers 160, 162, 164 may operate using the VMS operating system sold by Digital Equipment Corporation. Slave computer 166, may for example, use a UNIX operating system. As a further example, slave computer 166 may use an IBM operating system.

Master 120, in an exemplary embodiment, may be referred to as a server. Slave device 160, in an exemplary embodiment, may be referred to as a host computer. For example, master 120 may be an Ethernet server, communications pathway 110 may be an Ethernet local area network, and slave computer 160, 162, etc. may each be a VAX computer, all manufactured by Digital Equipment Corporation.

Personal computer 142 may use a Microsoft MS-DOS operating system. Also, as a further example, personal computer 142 may use an Apple operating system, as for example, personal computer 142 may be a Macintosh personal computer.

Terminals 140, 152, may, for example, be "dumb" terminals, of a type not having stand alone processing capability. Printers 144, 150, and 156 may, for example, be printers utilized by the various terminals connected to the communications pathway 110, and may print queues developed by any of the terminals or personal computers connected to communications pathway 110 through the slave computers 160, 162, 164, 166. Further, high speed terminals 122 and 126 may be workstations requiring a large band-width. For example, the band-width normally required by a personal computer 142, 154 is frequently sufficiently small that such a device may be multiplexed using master 120, 130 for its connection to communications pathway 110. In contrast, high speed terminals 122, 126 may require a much larger band-width because of large data transfers, for example, generated by operation of a windows protocol on the terminals, and so require a direct master connection to the communications pathway 110.

Figure 2:
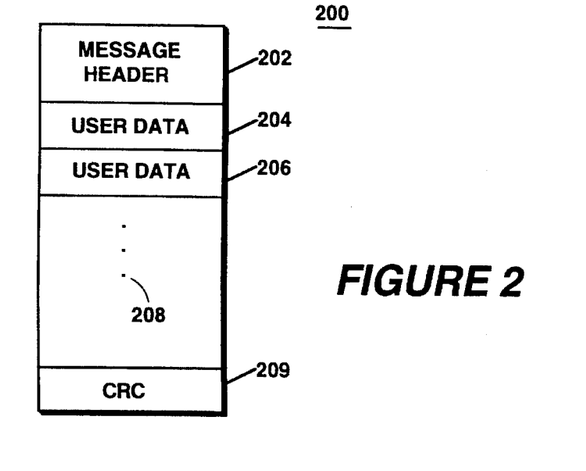
FIG. 2 is a field diagram of a message in accordance with the present invention.

Referring now to FIG. 2, there is shown a typical message format for use by communications pathway 110 in communicating information between masters 120, 122, 126, 130 and slave computers 160, 162, 164, 166. Message packet 200 has a Message Header field 202, a user data slot 204, and another user data slot 206. Dots 208 indicate the possibility of a further plurality of user data slots in message 200. User data slots 204, 206, 208 are optional in the message 200. A message may comprise a Message Header field 202 only, for management purposes for communication system 100. Examples of management purposes are the transmission of an acknowledgment message, the transmission of a START message, the transmission of a STOP message, and other management type operations.

Message packet 200 has cyclic redundancy check data (CRC) in field 209 at the end of the packet. For any packet length, CRC data is contained in field 209. For example, in an Ethernet embodiment, CRC field 209 may be four bytes long. CRC field 209 provides data for a receiving station to test an incoming message packet, where the test is to determine if the bits making up the packet meet a criterion for successful transmission. In a receiving station, the sequence of events is: first the station detects that the incoming message packet is addressed to the receiving station; then the station performs a CRC test on the incoming packet; and if the packet passes the CRC test, then the station receives the packet. In the event that the packet fails the CRC test, then the receiving station simply discards the incoming packet and does not receive the incoming packet.

Capitalization, as follows, will be used in this document in order to improve the readability of the document. Message field names will have the initial letter of a word capitalized. Values of logical variables, such as SET and CLEAR will be fully capitalized. Also, specific message designations such as START, RUN, and STOP will be fully capitalized.

Figure 3:
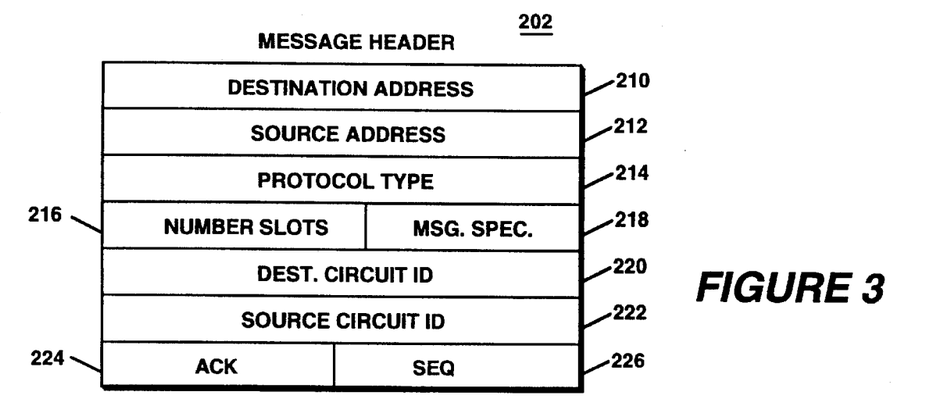
FIG. 3 is a field diagram of a message header of the message shown in FIG. 2.

Referring now to FIG. 3, there is shown a field diagram for a Message Header field 202. Fields of Message Header field 202 comprise the following: Destination Address field 210; Source Address field 212; Protocol Type field 214; Number of Slots field 216; Message Specification field 218; Destination Circuit Identification field 220; Source Circuit Identification field 222; Acknowledge field 224; and Acknowledge Sequence Number field 226. Destination Address field 210 gives the data link destination address of the receiving station. Source Address field 212 gives the data link address of the transmitting station. By the term "station", there is meant a computer, master or slave, connected to communications pathway 110, and capable of sending or receiving messages from data pathway 110. An example of stations are masters 120, 122, 126 and 130. Further examples of stations are slave computers 160, 162, 164 and 166. Protocol Type field 214 contains bits that represent the type of protocol utilized by message 200. For example, Destination Address field 210, Source Address field 212, and Protocol Type field 214 may be defined by a standard communications system 100 definition. For example, fields 210, 212, 214 may be defined as an Ethernet header.

The contents of Protocol Type field 214 may, for example, indicate to a receiving station the protocol of the received message is a message transmission control protocol of the type further discussed hereinbelow, or as, for example, disclosed in U.S. Pat. No. 4,975,905 disclosed hereinabove. Number of slots field 216 gives the number of user data slots 204, 206, 208 appended after Message Header field 202. Message Specification field 218 is further described hereinbelow in reference to FIG. 4.

Destination Circuit Identification field 220 is a virtual circuit identification utilized by the receiving station in setting up a virtual circuit for communication on communications pathway 110. Source Circuit Identification field 222 gives an identification number for the virtual circuit identified by the transmitting station for the communications session set up on communications pathway 110.

Acknowledge field 224 gives the sequence number of the last "in sequence" message packet received with a valid cyclic redundancy check. An "in sequence" message packet is a packet where it, and all earlier packets, had valid cyclic redundancy checks. Acknowledge Sequence number field 226 gives the sequence number of the present message packet 200.

Figure 4:
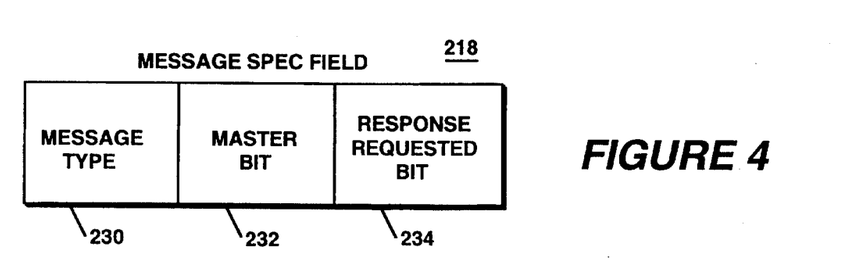
FIG. 4 is a field diagram of a Message Specification field shown in FIG. 3.

Referring now to FIG. 4, there is shown a field diagram of Message Specification field 218. Message Type field 230 contains a flag showing whether the message is a START message; a RUN message; or a STOP message. Master Bit field 232 indicates, if the bit is SET, that the message is from a "master" station. The bit in Master Bit field 232, if "CLEAR", indicates that message 200 was transmitted by a slave station.

In the event that in a message 200 the Response Requested bit 234 is SET, the SET bit pattern indicates that the transmitting station requires an immediate acknowledgment of receipt of the message 200. In an exemplary embodiment of the invention, the field 234 contains only one bit, called the Response Requested bit. In the event that a master station transmits a message 200 with the Response Requested bit 234 CLEAR, then the CLEAR bit indicates that a delayed acknowledgment to receipt of message 200 is satisfactory for the transmitting master station. In the event that a slave station transmits a message 200 with the Response Requested bit CLEAR, then in some protocols the master does not transmit an acknowledgment.

Figure 5:
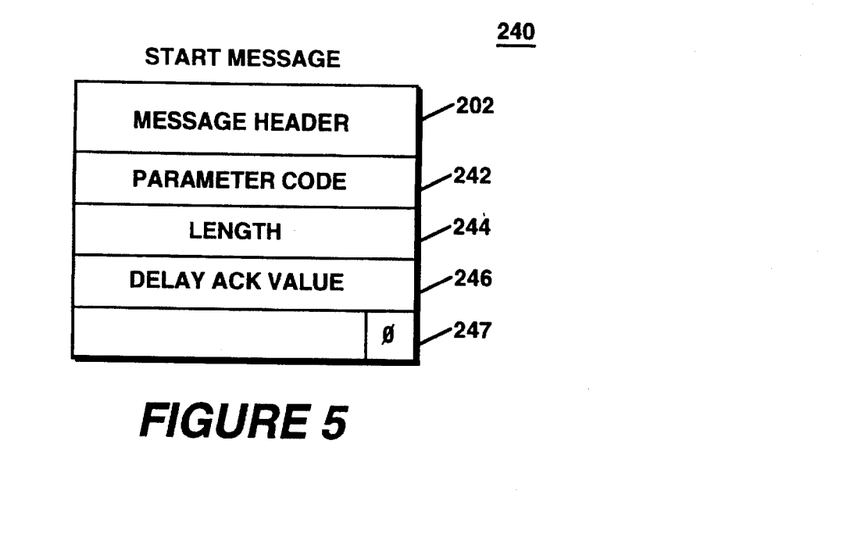
FIG. 5 is a START message field diagram in accordance with the invention.

Referring now to FIG. 5, there is shown START message 240. START message 240 has Message Header field 202. When Message Type field 230 indicates that the message is a START message, then the message packet takes the field form of START message 240. START message 240, in addition to Message Header field 202, has the following fields: Parameter Code 242; Length field 244; and Delay Acknowledge Value field 246, and Termination field 247.

Parameter Code field 242 may, for example, be one byte in length. Parameter Code field 242 has the following meanings: in the event, in a preferred embodiment of the invention, that Parameter Code field 242 contains eight bits, all set to zero, then the START message 240 contains no further fields; and, in the event, in a preferred embodiment of the invention, that Parameter Code field 242 has a designated bit set to ONE, then the START message 240 contains Length Field 244 and Delay Acknowledge Value field 246. Alternatively, there can be a sequence of parameter values, where the sequence is terminated by Termination field 247 containing, for example, a zero "0", or null. Fields 242, 244, 246, 247 may each be coded as one byte, or for example, as an eight bit integer. Alternatively, a bit mask could be used to code the fields. START message 240 may be terminated by a Termination field 247 containing a zero or null.

Length field 244 may, for example in a preferred embodiment of the invention, designate the number of bytes in the length of Delay Acknowledge Value field 246.

For example, Length field 244 may be contain a "2", indicating that Delay Acknowledge Value field 246 is two bytes in length.

Delay Acknowledge Value field 246, in a preferred embodiment of the invention, contains a number representing the amount of delay, in units of ten milliseconds, that an acknowledgment may be delayed by a receiving station. The protocol of delayed acknowledgment will be further described hereinbelow.

Figure 6:
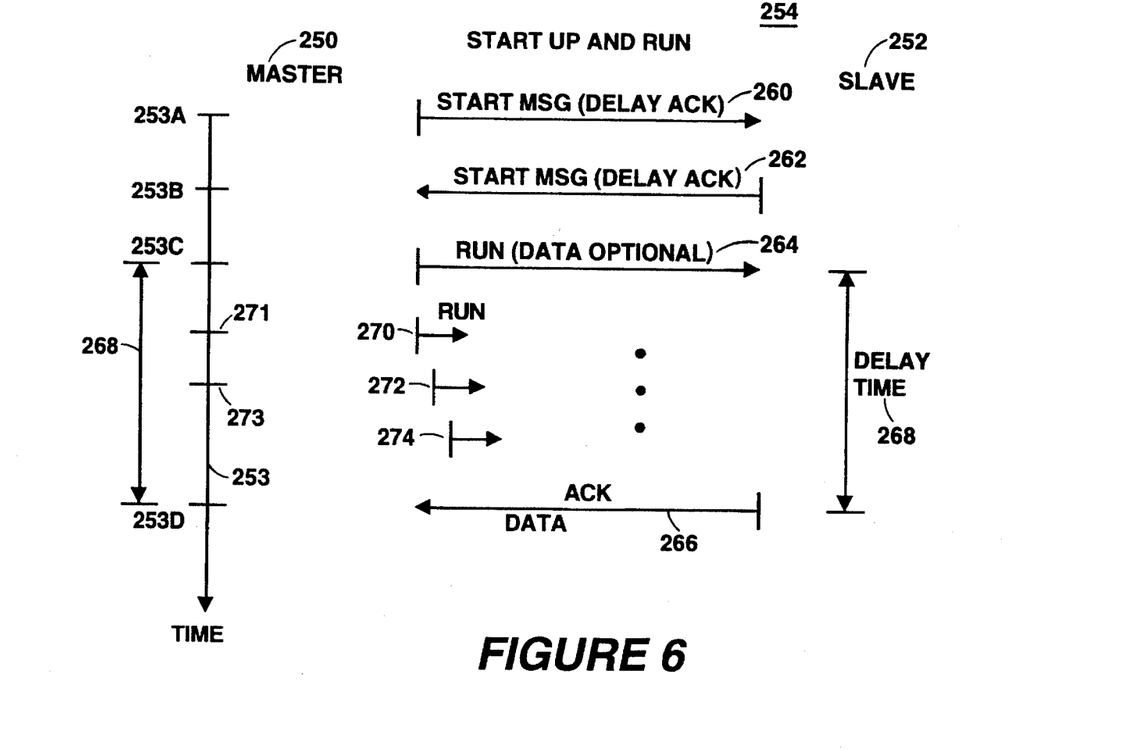
FIG. 6 is a protocol timing diagram in accordance with the present invention.

Referring now to FIG. 6, there is shown a message protocol timing diagram. A master station 250 is indicated on the left of the diagram, and slave station 252 is indicated on the right of the diagram. For example, the communications protocol utilized for transferring messages between masters 120, 122, 126, 130 on the communications pathway 110 to slaves 160, 162, 164, 166 may be an asymmetric protocol where one class of stations is a "master" station, and the other class of stations is "slave" station. For example, in a preferred embodiment of the invention, for the purpose of the communications protocol, the master stations 120, 122, 126, 130 are master stations. The computer stations 160, 162, 164, 166 are slave stations.

Master stations may be distinguished from slave stations by, for example, master stations being the only stations usually permitted to initiate a communications activity onto communications pathway 110, where slave stations usually only respond to initiated activity by the master station. Further, master stations may operate with a transmission timer, requiring a specified delay time between transmissions. In contrast, a slave station may be required to transmit information, as soon as it is prepared into form for transmission.

"Start up and Run" sequence 254, is shown in FIG. 6. START message 260 is transmitted, at time 253A, from master station 250, for example, a master 120, 122, 126, 130, to a slave station 252, for example, slave computer 160, 162, 164, 166. START message 260 may optionally include a request for the slave station 252 to practice delayed acknowledgment in accordance with the present invention. In the event that master station 250 requests that slave station 252 practice delayed acknowledgment, then Parameter Code field 242 will have the designated bit SET, indicating that delayed acknowledgment is requested. Other fields of START message 260 will contain the following: Message Specification field 218, will contain in Message Type field 230 and indication that START message 260 is a START message; the bit in Master Bit field 232 will be SET, indicating that the message is from a master station; and, Parameter Code field 242, as shown in FIG. 5, will have a designated bit SET; length field 244 will contain "2"; and Delay Acknowledge Value field 246 will contain a suggested value for a delayed acknowledge timer in the receiving slave station, where the receiving slave station is designated by Destination Address field 210. In an exemplary embodiment of the invention it has been found satisfactory to code various fields as eight bit integers.

The receiving slave station may negotiate an alternate value for the value of the delayed acknowledge timer, as described hereinbelow.

The receiving slave station 252, at a later time 253B as shown in FIG. 6, transmits START message 262, where the Destination Address field 210 of START message 262 contains the data link address of the initiating master station 250. START message 262 has the field structure of START message 240, FIG. 5. In the event that receiving slave station 252 has the ability to support delayed acknowledgment, then START message 240 will have the fields: Parameter Code field 242 will have a designated bit SET; Length field 244 of START message 262 will have the value of "2"; and, Delay Acknowledge Value field 246 will have a value suggested by slave station 252 for the delayed acknowledge timer to be used by slave station 252. Slave station 252 may suggest a delay time in Delayed Acknowledge Value field 246 of START message 262 which is the same as the value transmitted by master station 250 in START message 260, or alternatively, slave station 252 may suggest a different value for the delay timer. In the event that slave station 252 is not capable of supporting delayed acknowledgment, START message 262 will indicate this fact, by for example, having a zero value in Delay Ack field 246, or by for example, following Message Header field 202 by Termination field 247.

A reason for a slave station 252 suggesting a different value for the delayed acknowledgment timer than the one received in START message 260 may be found in different timer granularity between the master and the slave stations. Both the master and the slave utilize a clock having a certain granularity, where that granularity may be normally expressed in terms of milliseconds.

That is, granularity of the computer timer in slave computers 160, 162, 164, 166 may each be different, and may each be different from the granularity of the timer of the initiating master station, for example, master station 120, or master station 122, or master station 126, or master station 130, and so forth.

For example, the master may be operating under a VMS operating system, as supplied by Digital Equipment Corporation. The slave computer may be operating under a UNIX operating system, and have a totally different clocking structure from the master 120. Further, slave computer 164, for example, may be a Cray super computer, or it may be an IBM main frame computer, or it may be VAX Computer manufactured by Digital Equipment Corporation, or it may be a MicroVax Computer, manufactured by Digital Equipment Corporation, or it may be any of a number of other types of computers. Accordingly, it is reasonable to expect that the time granularity in a master 120, 122, 126, 130 will differ from the time granularity in a slave computer 160, 162, 164, 166.

Upon receipt of START message 262 by master station 250, for example, master 120, 122, 126, 130, master station 250 decides whether or not it can support the delayed acknowledgment timer value contained in START message 262 at Delay Acknowledge Value field 246. In the event that master station 250 decides that the delayed acknowledgment timer value contained in START message 262 at Delayed Acknowledge Value field 246 is acceptable, then master station 250 transmits a RUN message 264. RUN message 264 has the form of message 200, where Message Header field 202, at Message Specification field 218, at Message Type field 230 indicates that the message is a RUN message. For example, Message Type field 230 may contain a zero, "0" to indicate a RUN message. The RUN message 264, at Number of Slots field 216 may indicate user data slots containing data, or may optionally have the value "0" to indicate that the RUN message 264 contains no user data slots 204, 206, 208.

In the event that master station 250 decides that the delayed acknowledgment timer value contained in Delayed Acknowledge Value field 246 contained in START message 262 from the slave station is unacceptable, then a higher level function in master station 250 must make a decision. In an exemplary embodiment of the invention, the decision is for the master station 250 to terminate a virtual circuit between itself and the intended slave computer. In this event, the master station 250 terminates the virtual circuit by issuing a STOP message. In the event that master station 250 terminates this virtual circuit, then a higher level function in master station 250 decides the next step. For example, master station 250 may attempt to initiate another virtual circuit by sending a new START message with Parameter Code 242 CLEAR to indicate that delayed acknowledge is not requested from the slave station 252.

In the event that master station 250 decides that the delayed acknowledgment timer value contained in START message 262 at Delayed Acknowledge Value field 246 is acceptable, then master station 250 transmits RUN message 264 to slave station 252. Slave station 252 then delays transmitting an acknowledge message to master station 250 upon the receipt of data messages transmitted by a master station 250. For example, Delayed Acknowledge message 266 for RUN message 264 is delayed to time 253D, by a delay time 268. Time 253D occurs much later in time than receipt of RUN message 264. The absolute difference between time 253C, when RUN message 264 was received, and time 253D when Delayed Acknowledge message 266 was transmitted, is delay time 268. The value of delay time 268 is the value carried in Delay Acknowledge Value field 246 of START message 262 transmitted by the slave station 252.

Additionally, other run messages 270, 272, 274 may be transmitted by master station 250 during the delay time 268. Each of these RUN messages has a sequence number in Acknowledge Sequence Number field 226 of FIG. 3. A message containing data is successfully received if a cyclic redundancy check reports "good". Each run message 270, 272, 274, and so forth, that are transmitted before Delayed Acknowledge message 266 is transmitted by slave station 252, may be received by slave station 252, and also the cyclical redundancy check for the run message 270, 272, 274 may report "good". The Delayed Acknowledge message 266 will contain in its Message Header field 202, at Acknowledge field 224 the sequence number of the last received run message 270, 272, 274 received having a valid cyclical redundancy check. For example, if RUN data messages 264, 270, 272, 274 are received with a "good" cyclic redundancy check, and RUN data message 274 is the last RUN message received before Delayed Acknowledge message 266 is transmitted, then Acknowledge field 224 of Delayed Acknowledge message 266 will contain the sequence number of RUN data message 274.

In the event that a run message, for example, RUN message 272, is either not received by the intended slave station 252, or the cyclic redundancy check reports "bad" for RUN message 272, then Delayed Acknowledge message 266 will contain in its Acknowledge field 224 the sequence number of run message 270, the last received "good" RUN message just prior to the lost message.

For example, when an acknowledge message is delayed, it is possible for the slave to receive a series of RUN messages from the slave. A message in that series may be lost. If the message is not re-transmitted before the acknowledge message is to be delivered by the slave, the slave will not acknowledge the last good run message received, since that implies that all of the messages in the series have been received. Instead, the slave will acknowledge the good message received just prior to the first lost message.

In the event that master station 250 has transmitted several RUN messages, for example, RUN message 272, 274, and then receives a Delayed Acknowledge message 266 having the sequence number of an earlier transmitted RUN message 270, then the master station 250 must re-transmit all RUN messages transmitted later in time than the RUN message 270 having its sequence number contained in Delayed Acknowledge message 266.

By Delayed Acknowledge message 266 containing, in Acknowledge field 224, the sequence number of the last "correctly" received RUN message prior to a lost message, the order of received transmissions is maintained. A "correctly" received RUN message has its CRC test report "good".

A benefit of delaying Delayed Acknowledge message 266 by delay time 268 is that the acknowledge traffic on communications pathway 110 is reduced. That is, no acknowledge message was transmitted for the individual RUN message 264, 270, 272, 274, and so forth. For example, if ten RUN messages are transmitted by a master station during the delay time 268 and all are received with a good cyclic redundancy check, then nine acknowledge messages are eliminated from communications pathway 110.

By requiring that Acknowledge Sequence Number field 226 of each RUN message 264, 270, 272, 274 and so forth, contain the sequence number of that particular RUN message, coupled with the placement in Delayed Acknowledge Message 266, in Acknowledge field 224, the sequence number of the last correctly received message packet 200, enables the necessary "hand shaking" between the transmitting station and the receiving station to ensure accurate receipt of all transmitted message.

In an exemplary embodiment of the invention, it has been found that the present invention may eliminate as much as ⅓ to ½ of the message traffic on communications pathway 110. That is, with the present invention, in an exemplary embodiment, there are between ⅓ and ½ fewer messages on communications pathway 110 as a result of the improvement in the communications protocol made by the present invention. Accordingly, the communications protocol of the present invention is more efficient both with respect to network utilization, and in respect to CPU utilization in both the master station 250 and the slave computer slave station 252.

A station has a retry timer. A retry timer serves the function that if it expires before the receipt of an Acknowledge Message, then the retry timer causes the station to re-transmit the unacknowledged message. Accordingly, Delayed Acknowledge message 266 must be received before the retry timer of master station 250 expires. In an exemplary embodiment of the invention, the retry timer has a value of 1.0 second. Accordingly, it is reasonable for the START message 260 transmitted by master station 250 in the present invention, to suggest a value in Delay Acknowledge Value field 246 of somewhat less than the retry timer value. In an exemplary embodiment of the invention, a value of delay time 268 of ¾ the value of the retry timer has been found to be satisfactory on an exemplary simple LAN topology.

The delay acknowledge timer value contained in START message 260 by master station 250 may, for example, be computed as follows:

$$D\_A\_timer\ (master) = f * master\_retransmit\_timer\_value \quad EQ(1)$$

"f" is the fraction of the master station 250 retry timer used by the master station 250 to suggest the value of delay time 268, and contained in START message 260 transmitted by master station 250.

"master_retransmit_timer" is the master station retry timer value, in 10 millisecond units. That is, the master station 250 waits for an acknowledgment message for a time interval of "master_retransmit_timer" before re-transmitting an unacknowledged RUN data message.

In an exemplary embodiment of the invention as mentioned hereinabove, it has been found, for example, that a value of f=0.75 is satisfactory. In the event that the master station 250 re-transmit timer is set at a value of 1.0 second, or 100 time units of 10 milliseconds each, and f has a value of 0.75, then the acknowledgment delay time 268 will be 750 milliseconds, or 75 units of 10 millisecond each. The exemplary values have been found to be satisfactory in an embodiment of the invention using a simple LAN topology such as shown in FIG. 1. In a more complex LAN topology where the messages must pass through bridges or routers, it may be necessary to use a different value of f in order to account for the delay introduced by message forwarding. An optimum value of f may have to be determined on the basis of the LAN topology employed in a particular case.

A slave station 252 may attempt to negotiate a different value for the acknowledgment delay time 268 as follows.

A value for the delay acknowledgment timer suggested by slave station 252 in START message 262 may be computed as follows:

Slave Delay acknowledge timer value = $\dfrac{D\_A\_timer(master)}{slave\ timer\ (10\ millisecond\ units)}$   EQ (2)

The value of D_A_timer(master) is learned by the slave computer by reading START message 260.

"slave timer (10 millisecond units)" is the operating system timer granularity of the slave computer as expressed in 10 millisecond units.

For example, the master station 250 may, in START message 260 suggest a "Delay Acknowledge Timer Value" of ¾ * 1.0 second, or 750 milliseconds. (The Master retry timer value is taken to be 1.0 second.) That value is 75 time units of 10 milliseconds each.

As a further example, the slave computer may have a timer granularity of 20 milliseconds, and so be unable to support a "Delay Acknowledge Timer Value" of 75 time units of 10 milliseconds each. By discarding the fractional portion of the result of EQ(2), the slave station 252 will arrive at a value of 740 milliseconds, that is a value of 37 units of 20 milliseconds each.

Accordingly, slave station 252 will place the value 74 in START message 262 at field 246, for 74 time units of 10 milliseconds each. The master station 250 will determine that it can support a "Delay Acknowledge Timer" value of 74 units of 10 milliseconds, and in response will transmit RUN message 264. The Delay Timer Interval delay time 268 will be assigned the value of 740 milliseconds, or 74 units of 10 milliseconds each.

In the event that master station 250 finds that the value of Delayed Acknowledgment Timer transmitted by slave station 252 in START message 262 to be acceptable, then master station 250 transmits RUN message 264 to slave station 252, thereby establishing a virtual circuit for communications over communications pathway 110.

Destination Circuit Identification field 220 and Source Circuit Identification field 222 are utilized to establish a virtual circuit for communications between the master 120, 122, 126, 130 and a slave computer 160, 162, 164, 166. Once a connection is established, and a virtual circuit identification number is assigned, then the master and the slave communicate in a session utilizing a virtual circuit. For example, in the event that terminal 140 desires to communication with slave computer 164, then master 120 will establish a virtual circuit with assigned virtual circuit numbers, where the master utilizes destination circuit identification number and the slave utilizes a source virtual circuit identification number.

In the event that a virtual circuit is established between a specific master and a specific slave node, then the master may respond to further requests for connection between the specific master and specific slave by establishing a plurality of sessions using that virtual circuit. For example, sessions may be established using user data slots 204, 206, 208. As a further example, in the event that slave computer 164 responds to a request from terminal 140 to print data on printer 144, then a session is established in the virtual circuit and on this session data will be transmitted by the slave computer 164 to master 120. Further, personal computer 142 may establish another session on the virtual circuit with slave computer 146. Similarly a particular master may establish a plurality of sessions over the virtual circuit between that particular master and the slave computer.

In an exemplary embodiment of the invention, a specific master node and a specific slave node may establish only one virtual circuit therebetween. In the event that a virtual circuit is established using delayed acknowledgment, then all sessions established using that virtual circuit must use delayed acknowledgment. In an exemplary embodiment of the invention, a process may attempt to establish a session, that process then learns that the virtual circuit which it must use has Delayed Acknowledgment enabled, and so the process uses delayed acknowledgment. Even further, a particular terminal, such as terminal 140, may establish multiple sessions with a slave computer such as slave computer 164 using a single virtual circuit for all sessions.

In the still further event that the process rejects the use of Delayed Acknowledgment, then the process must fail to establish a virtual circuit connection. A higher layer in the master protocol must then decide what to do. For example, the process may decide that it can use Delayed Acknowledgment, or alternatively the process may decide that Delayed Acknowledgment is unacceptable and refuse to establish a session. The process must then report to a higher level that neither a virtual circuit was opened nor a session established in an existing virtual circuit, because no appropriate virtual circuit is available. For example, a process running X Windows protocol may use delayed acknowledgment, but for a person to read his electronic mail, delayed acknowledgment may cause an unacceptable annoying delay in the event that a packet must be re-transmitted. However, in practice, packets are rarely lost.

In a further exemplary embodiment of the invention, a process that finds that an established virtual circuit is unacceptable because that virtual circuit has Delayed Acknowledgment enabled, or alternatively finds that the established virtual circuit is unacceptable because it does not have Delayed Acknowledgment enabled, then the process may cause a second virtual circuit to be established between the master as master and the slave computer as slave.

Arrow 253 indicates the flow of time in the message protocol timing diagram of FIG. 6. A communications session is initiated at time 253A by master station 250 transmitting START message 260 to a slave station 252. Other events occur later in time. For example, START message 262 is transmitted by slave station 252 at time 253B. RUN message 264 is transmitted by master station 250 at time 253C. Delayed Acknowledge message 266 is transmitted by slave station 252 at time 253D.

The response requested bit in Response Requested bit 234 gives the master station 250 an opportunity to override the delayed acknowledgment feature of an established delayed acknowledgment session. The master station may need an immediate acknowledgment to a RUN message. For example, if master station 250 has, for example, all its transmission buffers filled, where the transmission buffers hold data in the event that a re-transmission is required, then the master station requires an immediate acknowledgment to RUN messages.

In the event that the master station 250 requires an immediate acknowledgment to a RUN message, then the master station sets the bit in Response Requested bit 234 to SET. The slave station 252 responds to the SET bit in Response Requested bit 234 by immediately sending an acknowledgment message to the master station 250, if the cyclic redundancy check upon receipt of the RUN message by the slave station is good. Additionally, a slave station may SET the response requested bit in order to request an immediate acknowledgment from a master station.

The stations have a means for the master to override the means for the slave computer to delay sending the acknowledgment by setting a response requested flag in a message, and in response to receiving the message with the response requested flag set, the slave computer sends an acknowledgment to the master without delay.

Whenever a Delayed Acknowledgment message 266 is sent by the slave station, the delayed acknowledgment timer in the slave station is reset to begin measuring the delay time 268 obtained from the Delay Acknowledge Value field 246 from the START message.

Figure 7:
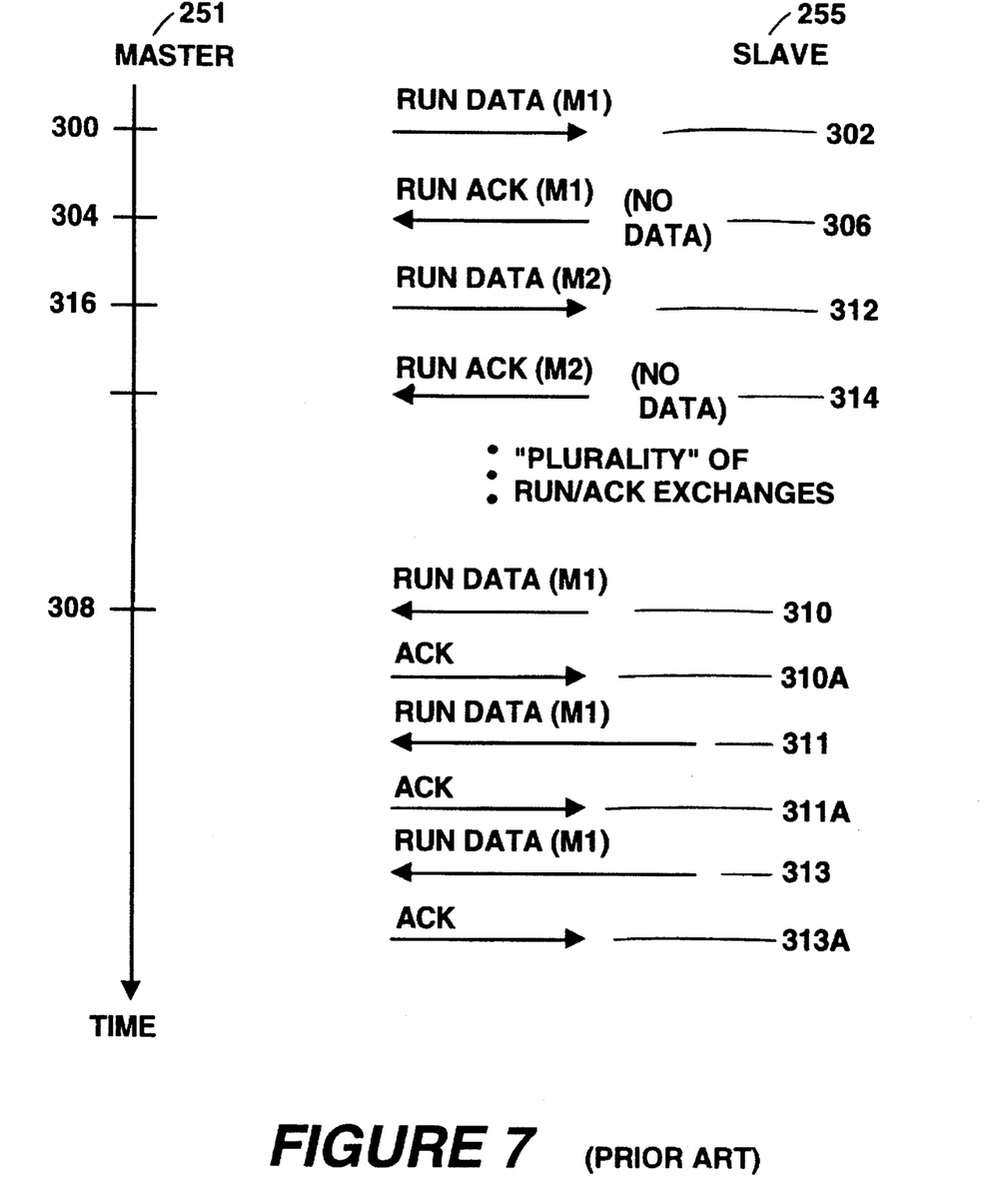
FIG. 7 is a is a protocol timing diagram used in the prior art.

Referring now to FIG. 7, operation of the present invention may be contrasted with operation as disclosed in the prior art. In FIG. 7 there is shown an acknowledgment message protocol used in the prior art. At time 300 the master station 251 sends a RUN data message 302 containing data to the Slave 255 computer. Immediately thereafter, at time 304, the Slave computer acknowledges RUN data message 302 by sending an Acknowledgment message 306 to the master station. An acknowledgment message may be referred to alternatively as an ACK message. In most situations the ACK message 306 is sent so soon after receipt of RUN data message 302 that ACK message 306 does not contain any data. And in an exemplary embodiment of the invention, an ACK message may be piggybacked with data. Much later, at time 308, the slave sends RUN data message 310 containing data in response to RUN data message 302. Even more RUN data messages 311, 313, containing data in response to RUN data message 302 may be sent by the slave at later times as processing of RUN data message 302 continues. Acknowledgment messages ACK 310A, ACK 311A, and ACK 313A are not sent during usual operation, but will be sent if the slave 255 sets the Response Requested bit 234 shown in FIG. 4. Slave 255 sets the Response Requested bit 234 only if slave 255 needs a quick response, for example, if it is running out of buffers, etc.

Similarly, a plurality of messages, including a quickly sent RUN acknowledgment message containing no data, and later sent RUN messages carrying data, may be transmitted by the slave in response to each RUN data message received by the slave such as RUN data message 312. RUN message 314 is the immediate acknowledgment to RUN data message 312, and RUN data message 314 contains no data. Data in response to RUN data message 312 will be transmitted later by the slave 255.

In contrast, an advantage of the present invention, is that during delay time 268, in FIG. 6, the slave station may fully process the data contained in RUN data message 264, and that data is included in Delayed Acknowledge message 266. That is, Delayed Acknowledge Message 266 contains data generated by slave station 252, and that data and the acknowledgment to the receipt of RUN message 264 are piggy-backed into one response message 266. Accordingly, in contrast with the old operating protocol shown in FIG. 7, the present invention may eliminate a plurality of messages on communications pathway 110.

Circuit Timer

A note on terminology follows. The following simplifications in terminology are introduced. Master 120 will be referred as a representative master when any master is equally applicable, rather than repeating the reference numerals of all masters. Similarly, slave 160 will be referred to as representative of all slaves, rather than repeating all slave reference numerals. An acknowledgment message will be referred to as an ACK message, and acknowledgment will be generally abbreviated by ACK. As those skilled in the art understand, a reference to a representative master or to a representative slave is a reference to any master or any slave.

The master contains a circuit timer. The circuit_timer_value is a parameter internal to master 120, and after the circuit timer is reset, the circuit timer fires at the expiration of a time interval of circuit_timer_value. In exemplary embodiments of the invention it has been found that values in the range 30–80 milliseconds are satisfactory values of the parameter circuit_timer_value.

Data can be transmitted by the master only upon the expiration of the circuit timer. A data message, or a plurality of data messages, will be transmitted by master 120 to slave 160 upon the expiration of the circuit timer in master 120 in the event that one of the following conditions is met when the circuit timer fires:

1. data by one user 140, 142 is ready to transmit;
2. an ACK message must be sent to the slave;
3. a management message must be sent to the slave. For example, the master may send credits to the slave, as discussed hereinbelow in the section, "Slot Flow Control".

The minimum time between transmissions of RUN data messages 270, 272, 274 of FIG. 6 is the time interval of the parameter circuit_timer_value. For example, the time interval between time 271, when RUN data message 270 is transmitted, and time 273, when RUN data message 272 is transmitted, is the value of the parameter circuit_timer_value.

Each user 140 may have a plurality of sessions with slave 160. Each session is an identified connection between master 120 and slave 160. Data for an identified session is carried in a slot 204, 206, 208 (FIG. 2), and the slot data has a header that identifies its session.

Figure 8:
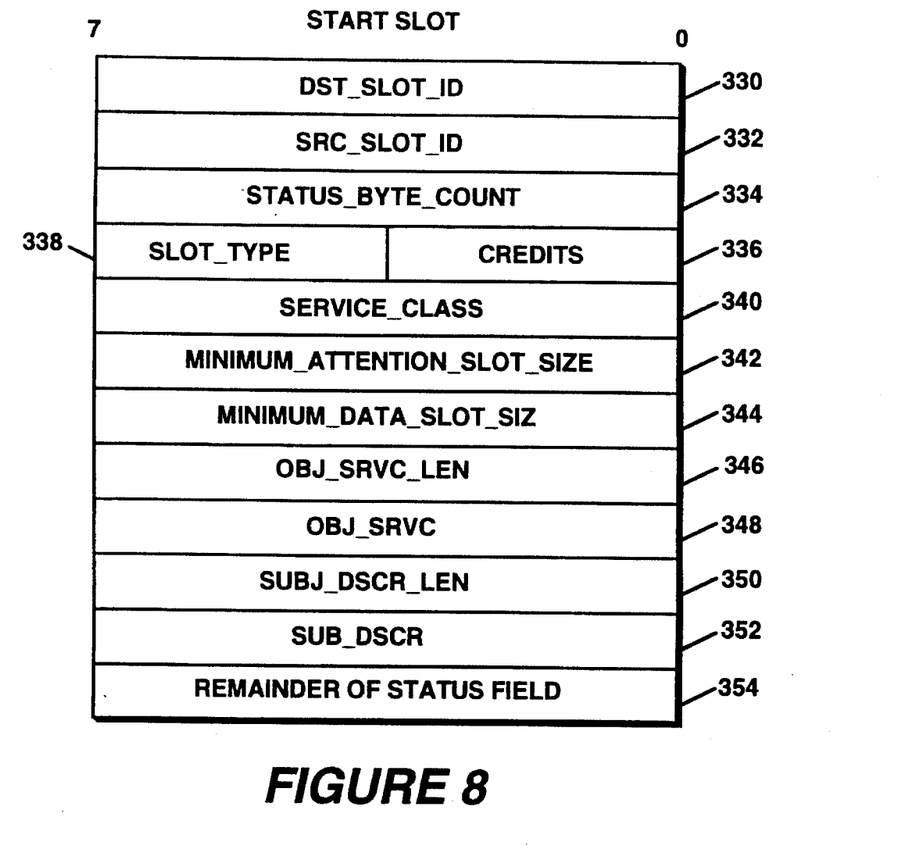
FIG. 8 is a field diagram of a START slot message.
Figure 9:
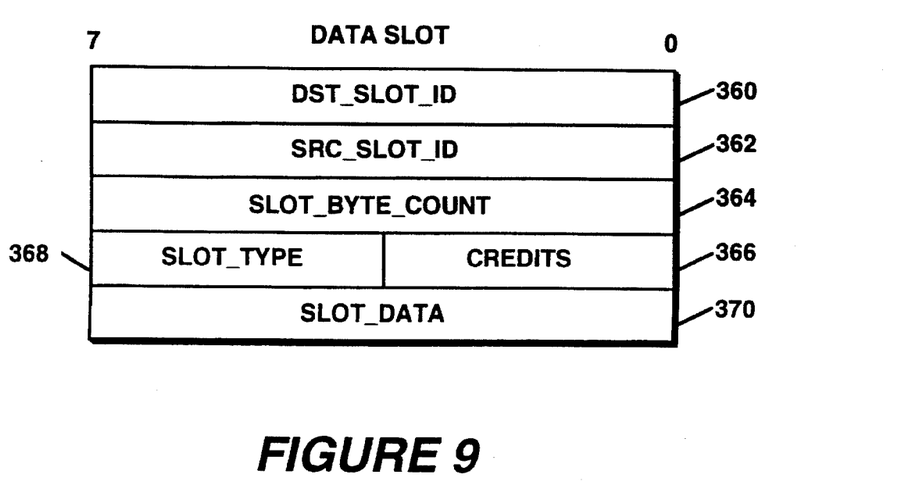
FIG. 9 is a field diagram of a DATA slot message.

Slot field format for an exemplary embodiment of the invention are shown in FIG. 8 and FIG. 9.

A session is started by a START slot in a RUN message, as shown in FIG. 8. The START slot shown in FIG. 8 is carried in slot 204, 206, 208, of FIG. 2. Fields shown in the START slot of a RUN message shown in FIG. 8 have the following meanings:

DST_SLOT_ID field 330—slave Slot Identification

SRC_SLOT_ID field 332—master Slot Identification

STATUS_BYTE_COUNT field 334—an unsigned integer count of the length of the STATUS field.

CREDITS field 336 (4 bits)—a 4 bit integer equal to the number of credits being transferred.

SLOT_TYPE field 338 (4 bits)—the value 9 (1001).

SERVICE_CLASS field 340—Provides Extensions to the Protocol for Specialized Uses.

MINIMUM_ATTENTION_SLOT_SIZE field 342 (1 byte)—not including the slot header. An attention message is a management message.

MINIMUM_DATA_SLOT_SIZE field 344 (1 byte)—not including the slot header.

OBJ_SRVC_LEN field 346 (1 byte unsigned)—The byte count of the next field.

OBJ_SRVC field 348—The name of the destination applications program.

SUBJ_DSCR_LEN field 350 (1 byte unsigned)—The byte count of the next field.

SUBJ_DSCR field 352—The description of the source service.

REMAINDER OF STATUS field 354—a particular implementation will have several status values.

Data is transmitted in the session by SLOT DATA messages as shown in FIG. 9. The SLOT DATA messages are carried in slots 204 206 208 of FIG. 2. The fields shown in the SLOT DATA message of FIG. 9 are as follows:

DST_SLOT_ID field 360—Destination Slot Block. A Slot Block is a designation for buffers for a particular session.

SRC_SLOT_ID field 362—Source Slot Block. A Slot Block is a designation for buffers for a particular session.

SLOT_BYTE_COUNT field 364—an unsigned integer count of the length of the SLOT DATA field.

CREDITS field 366 (4 bits)—a 4 bit positive integer equal to the number of credits being transferred.

SLOT_TYPE field 368 (4 bits)—the value 0 for RUN (normal data) slots.

SLOT_DATA field 370—SLOT_BYTE_COUNT bytes of slot data.

Slot Flow Control

A virtual circuit is established between a master 120 and a slave 160 as a result of a request by a user 140. A session between the user 140 and the slave 160 is established by master 120 by the transfer, firstly, of a START slot message of FIG. 8, and then by the further transmission of DATA slots in RUN messages as shown in FIG. 9. A plurality of sessions may be established between user 140 and slave 160 by starting each with a START slot message, and then exchanging data using SLOT DATA messages. The apparatus keeps the various sessions straight by reference to the DEST_SLOT_ID and the SRC_SLOT_ID fields.

Transmit buffers at the transmitter ultimately limit the number of slot data units that can be queued at any one time while waiting for transmission.

Receive Buffers at the receiver limit the number of slot data units that can be received at any one time.

Slot flow control is implemented in order to have a receive buffer ready for each slot of data transmitted. Slot flow control functions by limiting the number of slot transmit buffers available at any particular time for a given session (and ultimately for a given virtual circuit). Slot flow control is implemented by credits, carried in the CREDITS field in the SLOT START message, and carried in the CREDITS field of the SLOT DATA message. A credit is a value "owned" by a session, and is initialized by the value carried in the CREDITS field of the SLOT START message. The SLOT START message is sent by a first station, and the value in the CREDITS field informs the station receiving the SLOT START message of the total number of slot receive buffers available for that session at the first station.

Each slot of data transmitted decrements the transmitter session credits by one (1). Each credit received in ACK or data messages by the transmitter increments the session credits by one (1).

The receiver clears the session slot data from its receive buffer and moves the slot data to an applications program, and at the same time transmits an ACK message. In the event that there is a delay in slot data moving into an applications program, the credits at the transmitter will go to zero when all of the receive buffers of the receiver are filled, and therefore the transmitter will not be permitted to send any more slots of data for that session. After the receive buffers clear by slot data being transferred to the applications program, then ACK messages will be sent by the receiver to the transmitter, and will transfer credits as set out in the CREDITS field of the appropriate slots in the message carrying the ACK message. The transmitter may then use these credits to transmit more slots of data in the session. A particular ACK message may indicate that a plurality of slots of data have been transferred from receive buffers to an applications program, and the value carried in the CREDITS field gives the number of slot buffers that have been freed.

In an exemplary embodiment of the invention, the receiver returns one or more credits to the transmitter by sending a DATA slot with an appropriate value in the CREDITS field just before the transmitter is about to run out of credits. Normally the transmission of the credits is delayed until all slots of the RUN message are processed so that all appropriate CREDITS for various sessions can be returned to the transmitter. With delayed ACK the process of collecting and piggybacking credit returns with data can extend over multiple RUN messages. That is, reception of n RUN messages during a delayed acknowledgment delay time 268 can result in the return of all credits, and can ACK all of the n RUN messages, with a single RUN message response.

Buffer Memory

The amount of buffer memory needed in a master depends upon the number of times that the circuit timer expires during one delayed ACK delay time interval 268. For example, the circuit timer may expire ten (10) times during one delayed ACK delay time 268, for example if the circuit_timer_value is 80 msec and the delayed ACK delay time 268 is 800 msec. Each of these ten expirations of the circuit timer will require a set of buffers, and so in this example approximately 10 times more buffers may be required for operation of the circuit timer with delayed ACK, in contrast with instantaneous ACK.

The amount of memory that a master 120 must devote to transmit buffers, in relation to the number of credits permitted a particular session, is determined by a number of factors as follows: the amount of delay assigned to delayed acknowledgment; the value of the circuit_timer_value parameter; the maximum number of sessions permitted per virtual circuit; the maximum number of credits allowed per session; the maximum slot size; the number of retries before a circuit is terminated; the maximum data link layer header size; the virtual circuit header size; the slot header size; the maximum frame size; probability of a packet not being ACKed before the next circuit timer (ie, cyclic redundancy check errors; slow remote bridges between a master and the slave; slow slaves, etc.)

In a first example where the master 120 has only one frame with one slot of data at each expiration of the circuit timer, the number of transmit buffers which must be maintained are given as follows.

The number of transmitter buffers maintained by the master depends upon the number of unacknowledged data frames. The data frames are sent every circuit_timer_interval (80 msec).

The delayed ACK messages are sent by the slave every ACK Delay Time, which in the above example is given by:

$$\begin{aligned}
ACK \text{ Delay Time} &= f * \text{retry\_timer\_value} \\
&= 0.75 * 1{,}000 \text{ msec} \\
&= 750 \text{ msec}
\end{aligned}$$

and is then negotiated to 740 msec by the slave.

The number of unacknowledged data frames is determined by the circuit timer (80 msec), circuit_time_interval as follows:

number of unacknowledged data frames =

= $ACK$ Delay Time/circuit_time_interval

= 740 msec/80 msec

= (approximately) 9 frames per retry

If the number of retries permitted before the circuit is terminated is 9 retries, then the number of buffers needed will be, number of needed buffers =

= 9 frames for one retry * 9 retries

= 81 frames

So, there will need to be enough memory to provide buffers for 90 unacknowledged frames. However, in many cases a transmit window will be narrower than 90 frames. The estimate of 90 frames in this exemplary embodiment is a maximum number of frames in the event that the transmit window is not set to be less than 90 frames.

In a more realistic example where each virtual circuit may have a plurality of sessions, the amount of memory needed for transmit buffers is given as follows:

A=max sessions/circuit=8
B=max credits/session=6
C=max slot size=255
D=circuit timer=80 msec
E=number of retries before circuit is terminated
F=max frame size carried by LAN=1518 bytes
G=max datalink header size=22
H=LAN virtual circuit header size=8
I=LAN slot header size=4

Then, the max number of LAN transmit buffers to handle data traffic per 80 msec in this embodiment would be:

$$X = (((C+I)*B)*A)/(F-G-H)$$
$$= 9 \text{ frames per 80 msec}$$

and so if the ACK delay time is 740 msec:

$$Y = X * (740 \text{ msec}/80 \text{ msec})$$
$$= \sim 90 \text{ frames queued}$$

And to account for errors/delays in the LAN, the max transmit frames queueable in the retry interval would be $$Z = Y * E \text{ (assuming first message in queue}$$
$$\text{is always lost or delayed)}$$
$$= 720 \text{ frames}$$

Although more realistic than the first example, the second example is still somewhat unrealistic because nodes may not be equipped with the necessary 1 megabyte of memory to store 720 LAN frames. In a more realistic case, the maximum number of transmit buffers is limited by the cost of memory. The memory limitation is accounted for during virtual circuit setup. A node must negotiate the size of the transmit and receive "windows" when a virtual circuit is being started. The length of a window is the maximum number of messages that can be transmitted or received by the other node without the transmitter waiting for an ACK. When a first node tells the other node what its receive window size is, the first node bases that number on the number of receive buffers available to the first node.

Therefore, the "effective" size of a transmitter's window is directly related to the size of the other node's receive window even if the transmitter really has more free transmit buffers than that. In an exemplary embodiment of the invention, the window sizes are not re-negotiated once a virtual circuit is set up.

So, if a node's transmit window size is negotiated to 4 frames, but the node has the capacity to buffer 9 frames for transmission, the node can still only send a maximum of 4 frames at each circuit timer expiration. Credits are the quantitative measure maintained by the transmitter of the number of available receive buffers at the receiver.

A further advantage in implementing the present invention in a system having a circuit timer is that the slave node need not have the number of buffers increased. The master must have more buffers in order to account for multiple expirations of the circuit timer during one delayed acknowledgment delay time 268. So new masters offering increased buffer capacity along with new protocol at the slave to support delayed acknowledgment must be installed, with the advantage that more slave memory need not be dedicated to the invention. A still further advantage of the invention is that slave nodes which do not support delayed acknowledgment will work perfectly well with the new masters, as the START message negotiation will inform the master that the virtual circuit will not have delayed acknowledgment.

In the above examples, sufficient buffer memory is reserved for eight (8) retry transmission attempts. The optimum number of buffers needed for retry attempts must be determined for each LAN. For example, if the LAN is particularly free of noise, fewer retry attempts may be needed, and consequently less buffer memory will be needed. Also, less buffer memory may be reserved for retry attempts, and if the number of retry attempts exceeds the buffer memory reserved, then transmissions are halted until all retrys are finished. Halting transmission for retry attempts decreases virtual circuit bandwidth. But in the event that such halts are infrequent, the tradeoff between cost of buffer memory and infrequent reductions in bandwidth may favor the dedication of less memory to transmit buffers.

Validity Test for Data Messages

Figure 10:
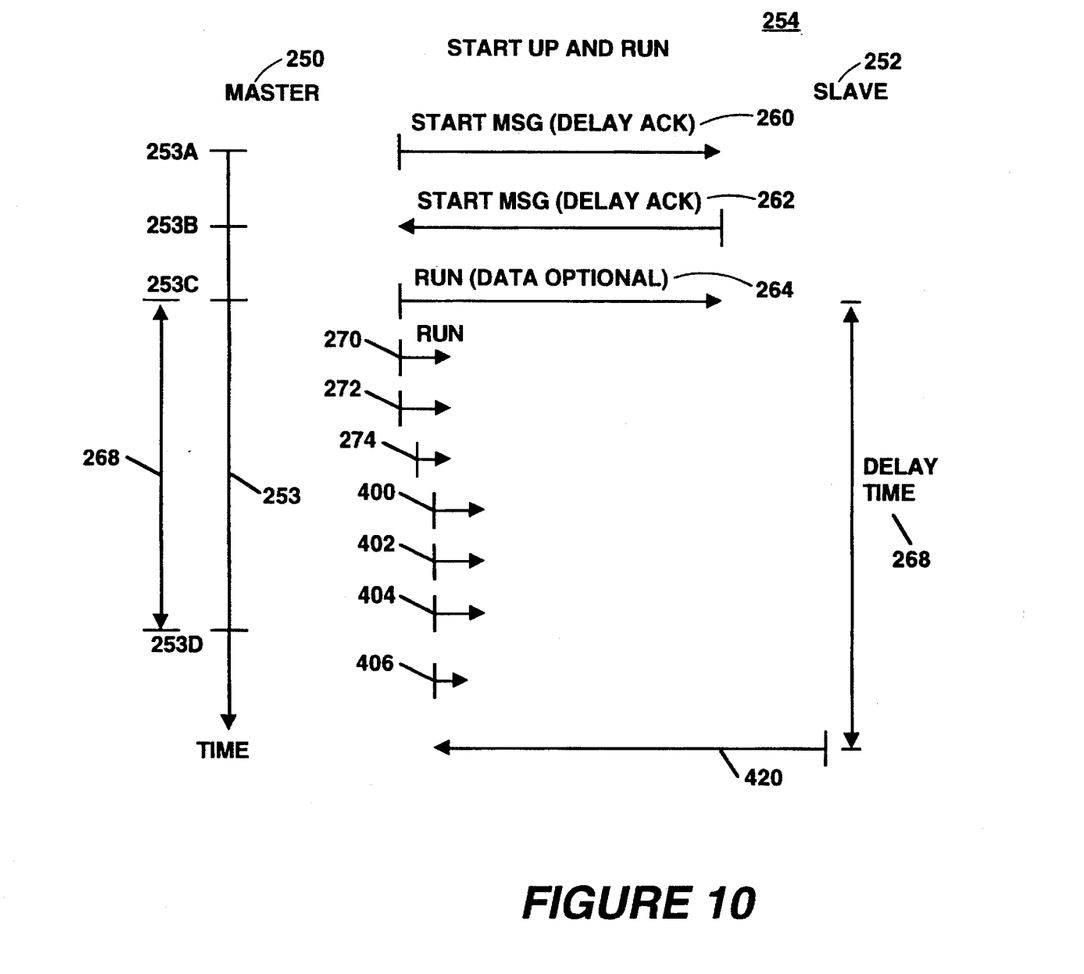
FIG. 10 is a protocol timing diagram in accordance with the invention.

Referring now to FIG. 10, RUN message 400 is transmitted by the master station 250, is detected by slave station 252, and fails the cyclic redundancy test. Accordingly RUN message 400 is not received by slave station 252. A distinction is drawn between a message that is "detected", and a message that is "received". A message addressed to a station is first detected, and then is tested by a validity test. In the event that the message passes the cyclic redundancy test, then the message is received by the station.

The validity test, in the preferred embodiment, is the cyclic redundancy test.

In the example shown in FIG. 10, RUN messages 264, 270, 272, and 274 pass the cyclic redundancy test and so are received by slave station 252. The next RUN message 400 fails the cyclic redundancy test. Subsequently transmitted RUN messages 402, 404, 406 pass the cyclic redundancy test and so may be received by slave station 252. Options as to how the system handles RUN messages subsequent to a message failing the cyclic redundancy test arise.

In a first option, slave station 252 ignores all RUN messages following detection of a RUN message failing the cyclic redundancy test. As discussed hereinabove, Acknowledge field 224 gives the sequence number of the last "in sequence" message packet received with a valid cyclic redundancy check. An "in sequence" message packet is a packet where it, and all earlier packets, had valid cyclic redundancy checks. In the present example, RUN messages 264, 270, 272, and 274 are in sequence message packets. RUN message 274 is the last in sequence message. Accordingly, delayed ACK message 420 will acknowledge the sequence number of RUN message 274 by having the sequence number of RUN message 274 in ACK field 224 (FIG. 3) of delayed ACK message 420. Acknowledge Sequence number field 226 (FIG. 3) gives the sequence number of the RUN message.

A consequence of the delayed ACK message 420 acknowledging a "last in sequence" RUN message 274, where the last in sequence RUN message 274 is followed by one RUN message 400 which failed the cyclic redundancy check, and is then followed by a number of messages 402, 404, 406, each of which passed the cyclic redundancy check, is that the master station must retransmit all of the valid RUN messages following the last in sequence RUN message 274, as well as the invalid RUN messages.

In an embodiment of the invention, the master station has sufficient buffer capacity to store the messages which must be retransmitted.

Flow control based upon credits limits the data transmission to the number of available buffers, as discussed hereinabove.

In an alternative embodiment, the master station simply keeps track of the transmitted messages, and then a higher communications layer, for example using software, reconstructs the messages which must be retransmitted, and they are retransmitted. However, in usual practice this embodiment is not used, and sufficient buffers are employed for the retransmit queue.

A second option is: that delayed ACK message 420 identifies all messages 270, 272, 274, 402, 404, 406, which pass the cyclic redundancy test, and so are received. In this option, only those messages failing the cyclic redundancy test, such as for example RUN message 400, must be retransmitted.

LAN Traffic

LAN traffic is significantly reduced by the use of delayed acknowledge with the circuit timer. The circuit timer provides aggregation of data at the master and so reduces data message traffic transmitted by the master. During the circuit_timer_interval a number of data items may arrive at master 120 from a number of different users for a number of different sessions. All of the data destined for a particular slave will be aggregated into one LAN message 200 at the expiration of the circuit timer. LAN traffic is thereby reduced by the number of messages aggregated by the circuit timer.

Likewise, LAN traffic from the slave is aggregated by delayed acknowledge operating at the slave. Without delayed ACK, the slave sends an ACK message to the master for each message received by the slave. By aggregating ACK messages over approximately ten (10) circuit timer expirations, the number of acknowledge messages on the LAN from a slave are significantly reduced. Further, the probability of data being ready at the slave at the expiration of the delayed ACK delay time is increased, and a substantial fraction of the acknowledgments will be piggybacked at ACK field 224 on data in slots 204, 206, 208.

A further advantage of the invention is that a person using a terminal 140, 142, 150, 154 may receive data back from a slave computer 160, 162, 164, 166 in only one round trip on the communications pathway 110. Master 120, 122, 126, 130, etc. operates as a terminal server for connection to the slave computer in accordance with the timing diagram shown in FIG. 6, where RUN data message 264 may carry data from the person to the slave computer, and where Delayed Acknowledge message 266 may carry data in response to RUN data message 264. Only one round trip time is needed for Delayed Acknowledge message 266 to return data in response to RUN data message 264. In contrast, in the prior art shown in FIG. 7, data in message M1 in RUN data message 302 must first be followed by receipt of ACK message 306 carrying no data, thereby accounting for a round trip on communications pathway 110, and then be followed by a later response in RUN data message 311. Accordingly, under conditions where access to communications pathway 110 introduces significant delay, the person will receive a quicker response from the slave computer using the invention than was possible in the prior art.

Using delayed ACK at both the master and the slave would not accomplish the beneficial aggregation of data messages at master 120 from various users 140 142. Further, a circuit timer at both the master and the slave would make the slave unresponsive to signaling by the master.

A traditional symmetrical delayed acknowledgment protocol, of the type disclosed in the textbook by Tanenbaum as disclosed hereinabove, is incompatible with a master—slave system, where the master is controlled by a circuit timer. At the master end of the communications pathway, the circuit timer and the Response Requested bit 234 of FIG. 4 interfere with a traditional delayed acknowledgment arrangement. The present invention, while maintaining the advantages of a master slave protocol, significantly improves performance of the communications network by reducing acknowledgment traffic from the slave computer through the use of asymmetric delayed acknowledgment from the slave computer.

Use of the circuit timer at the master coupled with delayed acknowledgment gains the benefit of aggregation of data at the master, and also aggregation of acknowledgments and data at the slave. Also setting the bit in the Response Requested bit 234 provides a mechanism for the master to override delayed acknowledgment in the slave.

It is to be understood that the above-described embodiments are simply illustrative of the principles of the invention. Various other modifications and changes may be made by those skilled in the art which will embody the principle of the invention, and fall within the spirit and scope thereof.

What is claimed is:

1. A computer communications system comprising:

means disposed in a master station of said computer communications system for aggregating data produced during a first interval of time into an aggregated data message;

means for sending said aggregated data message after said first interval of time to a slave station;

means, disposed in said slave station and responsive to said received aggregated data message and to any subsequent, received aggregated data messages for sending an aggregated acknowledge message to said master station upon expiration of a delay ACK time interval, said delay ACK time interval being greater than said first interval of time, and said aggregated acknowledge message acknowledging all data messages passing a validity check and received by said slave station during the time interval from the beginning of the delay ACK time interval until either a data message failing said validity check is detected or until expiration of said delay ACK time interval; and wherein said master station receiving said aggregated acknowledge message, recognizes each of said aggregated data messages acknowledged by said aggregated acknowledge message.

2. The apparatus as in claim 1 wherein said validity check further comprises:

a cyclic redundancy check.

3. The apparatus as in claim 1 further comprising:

means for permitting said master station to override said means for sending an aggregated acknowledge message, and responsive thereto, said slave station generates an immediate acknowledgment message.

4. The apparatus as in claim 3 wherein said means for permitting said master station to override said delayed acknowledge in said slave station further comprises:

means for setting a Response Requested Bit in a message from said master station to said slave station, wherein upon detection of said Response Requested Bit by said slave station, said slave station immediately sends an acknowledgment message to said master station.

5. The apparatus as in claim 1 further comprising:

means, disposed in said master station and said slave station, for selecting a delay timing interval as said delay ACK time interval.

6. The apparatus as in claim 5 wherein said means for selecting a delay timing interval, further comprises:

means, disposed in said master station, for sending a proposed delay timing interval to said slave station; and, means, disposed in said slave station, for accepting said proposed delay timing interval.

7. The apparatus as in claim 6 wherein said means for accepting said proposed delay timing interval further comprises:

means for transmitting a RUN message from said slave station.

8. The apparatus as in claim 6 further comprises:

means, disposed in said slave station, for rejecting said proposed delay timing interval by transmitting said proposed delay timing interval to said master station.

9. The apparatus as in claim 5 wherein said means for selecting a delay timing interval, further comprises:

means, disposed in said master station, for sending a proposed delay timing interval to said slave station;

means, disposed in said slave station, for proposing an alternative delay timing interval; and, means, disposed in said master station, for accepting said alternative delay timing interval.

10. The apparatus as in claim 9 wherein said means for accepting said alternative delay timing interval further comprises:

means for sending a RUN message from said master station to said slave station.

11. The apparatus as in claim 9 further comprising:

means for rejecting said alternative delay timing interval.

12. The apparatus as in claim 1 further comprising:

means for permitting said master station to override said means for sending said aggregated acknowledge message upon expiration of a delay ACK time interval by setting a response requested flag in a message, and in response to receiving said message with said response requested flag set said slave station sends an acknowledgment to said master station without delay.

13. The apparatus as in claim 1 wherein said means for sending sends a plurality of aggregated data messages from said master station to said slave station without receiving an acknowledgment from said slave station; and, said means for sending an aggregated acknowledge message sends a delayed group acknowledgment that at least a first group of said plurality of messages were received by said slave station, where said slave station delays sending said delayed group acknowledgment by a time interval of said delay timing interval.

14. An apparatus for communicating between a master computer and a slave computer, comprising:

means for sending a data message packet from said master computer to said slave computer after a first interval of time;

means for selecting a delay timing interval, said delay timing interval being greater than said first interval of time, said delay timing interval corresponding to an interval of time over which said data message packet and a plurality of subsequent data message packets may be sent by said master;

means for sending an acknowledgment message from said slave computer to said master computer, said acknowledgment message indicating that at least one message packet was received by said slave computer;

means for delaying said acknowledgment message from said slave computer to said master computer by said delay timing interval, with said delayed acknowledgment message acknowledging receipt of said data message packet and said plurality of said subsequent data message packets;

means, responsive to a retransmit time interval, for retransmitting any messages sent from said master computer to said slave computer during said delay timing interval and not acknowledged by said acknowledgment message.

15. An apparatus for communicating between a master computer and a slave computer, comprising:

means for sending a message packet from said master computer to said slave computer after a first interval of time;

means for sending an acknowledgment message from said slave computer to said master computer, said acknowledgment message indicating that said message packet was received by said slave computer;

means for sending a first proposed delay timing interval from said master computer to said slave computer;

means, in response to said first proposed delay timing interval, for sending a second proposed delay timing interval from said slave computer to said master computer;

means for accepting said proposed second delay timing interval, said second delay timing interval greater than said first interval of time;

means for delaying said acknowledgment message from said slave computer to said master computer by a time interval of said second delay timing interval, with said delayed acknowledgment message acknowledging receipt by said slave computer of said message packet and a plurality of subsequent message packets.

16. A data transmission system comprising:

a master station having a circuit timer, wherein said master station transmits a data message only upon expiration of said timer after a circuit-timer-value time interval;

a slave station having a delayed acknowledge timer, said slave station transmitting an acknowledge message after receiving said data message from said master station, and upon expiration of said delayed acknowledge timer after a delayed_acknowledge_time_interval; and transmit buffers in said master station, said transmit buffers occupying a quantity of memory, said quantity of memory being determined in response to said circuit_timer_value time interval and said delayed_acknowledge_time_interval.

17. A master comprising:

means for aggregating data into frames to transmit to a slave;

means for buffering said frames transmitted from said master in response to a slave delayed acknowledgment protocol, to preserve said transmitted frames in the event that at least one frame must be re-transmitted; and, means disposed in said master for overriding said slave delayed acknowledgment protocol by setting a flag in a message in the event that said master requires slave to send an acknowledgment of said message to said master immediately upon receipt of said message by said slave.

* * * * *